United States Patent
Beema et al.

(10) Patent No.: US 10,916,106 B2
(45) Date of Patent: Feb. 9, 2021

(54) SYSTEMS AND METHODS FOR EFFICIENT UTILIZATION OF WIRELESS BANDWIDTH

(71) Applicant: Ademco Inc., Golden Valley, MN (US)

(72) Inventors: Vishnu Vardhan Reddy Beema, Bangalore (IN); Sandeep Suresh, Bangalore (IN); Kenneth Eskildsen, Great Neck, NY (US)

(73) Assignee: Ademco Inc., Golden Valley, MN (US)

( * ) Notice: Subject to any disclaimer, the term of this patent is extended or adjusted under 35 U.S.C. 154(b) by 10 days.

(21) Appl. No.: 15/854,204

(22) Filed: Dec. 26, 2017

(65) Prior Publication Data
US 2019/0197838 A1 Jun. 27, 2019

(51) Int. Cl.
| | | |
|---|---|---|
| *G08B 1/08* | (2006.01) | |
| *H04J 3/06* | (2006.01) | |
| *G08B 26/00* | (2006.01) | |
| *H04W 72/04* | (2009.01) | |
| *H04W 72/12* | (2009.01) | |
| *H04W 84/12* | (2009.01) | |
| *H04W 84/18* | (2009.01) | |
| *H04W 88/10* | (2009.01) | |

(52) U.S. Cl.
CPC ............. *G08B 1/08* (2013.01); *G08B 26/007* (2013.01); *H04J 3/065* (2013.01); *H04J 3/0691* (2013.01); *H04W 72/0446* (2013.01); *H04W 72/0453* (2013.01); *H04W 72/1215* (2013.01); *H04W 84/12* (2013.01); *H04W 84/18* (2013.01); *H04W 88/10* (2013.01)

(58) Field of Classification Search
None
See application file for complete search history.

(56) References Cited

U.S. PATENT DOCUMENTS 5,590,131 A * 12/1996 Kabatepe .............. H04J 3/1682
370/461
5,719,859 A * 2/1998 Kobayashi ........... H04B 7/2659
370/347
(Continued)

FOREIGN PATENT DOCUMENTS

EP 2 988 541 A1 2/2016

OTHER PUBLICATIONS

Extended European search report for corresponding EP patent application 18191918.4, dated Jan. 9, 2019.

*Primary Examiner* — Christopher T Wyllie
(74) *Attorney, Agent, or Firm* — Fredrikson & Byron, P.A.

(57) ABSTRACT

Systems and methods are provided that include an access point receiving a request from a device to join a first network defined by a first protocol, the access point allocating a slot of a superframe to the device, and the access point allocating remaining slots of the superframe to communication by the access point on a second network defined by a second protocol. Additionally or alternatively, some methods can include the access point enabling a first transceiver communicating via the first protocol and either, when the first transceiver receives first data from the device via the first protocol within a predetermined time of a beginning of the slot, receiving second data from the device via the first protocol for a remainder of the slot or, when the first transceiver module fails to receive the first data, the access point enabling a second transceiver for the remainder of the slot.

14 Claims, 5 Drawing Sheets

(56) References Cited

U.S. PATENT DOCUMENTS

| | | |
|---|---|---|
| 7,058,040 B2 | 6/2006 | Schmidt |
| 7,430,400 B2 | 9/2008 | Russo et al. |
| 8,488,478 B1 | 7/2013 | Leytus |
| 8,611,268 B1* | 12/2013 | Thandaveswaran .......................... H04W 52/0206 370/311 |
| 2002/0196803 A1* | 12/2002 | Ota ....................... H04L 12/413 370/442 |
| 2006/0031437 A1* | 2/2006 | Chambers ............. H04L 5/0037 709/223 |
| 2007/0197256 A1 | 8/2007 | Lu et al. |
| 2007/0239888 A1* | 10/2007 | Croxford .............. G06F 13/372 709/236 |
| 2009/0303931 A1* | 12/2009 | Yamauchi ............... H04L 45/00 370/328 |
| 2011/0019652 A1 | 1/2011 | Atwal |
| 2012/0201231 A1* | 8/2012 | Omeni ............. H04W 72/0426 370/337 |
| 2012/0306284 A1* | 12/2012 | Lee ...................... H04B 5/0037 307/104 |
| 2013/0058318 A1* | 3/2013 | Bhatia ................. H04W 56/001 370/337 |
| 2013/0149966 A1* | 6/2013 | Lee ...................... H04W 12/08 455/41.2 |
| 2013/0336334 A1* | 12/2013 | Gilbert ................ G06F 13/4265 370/458 |
| 2014/0233536 A1* | 8/2014 | Kang .................... H04L 5/1438 370/336 |
| 2014/0321443 A1* | 10/2014 | Samudrala ............ H04J 3/1694 370/337 |
| 2015/0023314 A1* | 1/2015 | Thubert ................ H04L 1/1854 370/330 |
| 2016/0044661 A1* | 2/2016 | Suresh .................... H04W 4/50 370/337 |
| 2016/0165597 A1* | 6/2016 | Konopacki, Jr. ............................ H04W 72/0446 370/329 |

* cited by examiner

SYSTEMS AND METHODS FOR EFFICIENT UTILIZATION OF WIRELESS BANDWIDTH

FIELD

The present invention relates generally to wireless communications. More particularly, the present invention relates to systems and methods for efficiently using wireless bandwidth, such as bandwidth within the 2.4 GHz band, sub-GHz bands, or any other frequency bands.

BACKGROUND

Security systems are known to detect threats within a secured area. Such threats include events that represent a risk to human safety or a risk to assets.

Security systems typically include one or more sensors that detect the threats within the secured area. For example, smoke, motion, and/or intrusion sensors are distributed throughout the secured area in order to detect the threats.

In most cases, the sensors are monitored by a control panel, and in some situations, the control panel wirelessly communicates with the sensors via Institute of Electrical and Electronics Engineers (IEEE) 802.15.4 protocols (e.g. Zig-Bee, Thread, etc.). Furthermore, when one of the sensors is activated, the control panel sends an alarm message to a central monitoring station, and in some situations, the control panel wirelessly communicates the alarm message to the central monitoring station or a user device via a router using IEEE 802.11 Wi-Fi protocols.

However, when such wireless communication occurs several wireless protocols (e.g. LTE, 802.11, 802.15.4) are competing for a limited amount of wireless bandwidth in the same wireless band (e.g. 2.4 GHz). This issue of limited bandwidth is exacerbated when numerous devices, such as mobile devices, cell phones, and security system sensors, all communicate wirelessly within the same wireless band, thereby raising the potential for communication interference. Accordingly, there exists a need for improved systems and methods for wireless bandwidth management.

DETAILED DESCRIPTION

Figure 1:
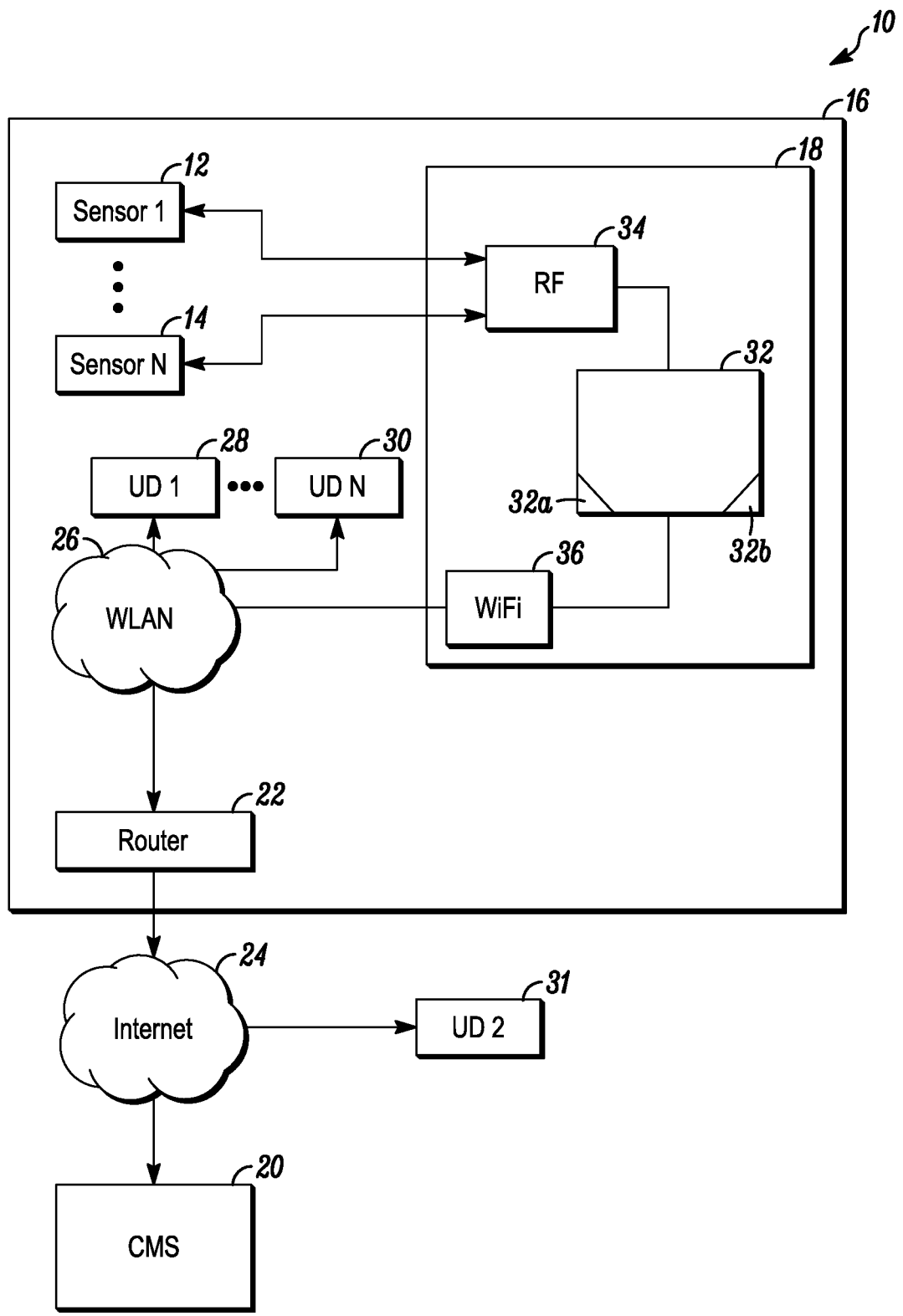
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for efficiently using slots of a time division multiple access (TDMA) superframe between one or more wireless protocols. For example, the slots of the TDMA superframe can be allocated between Institute of Electrical and Electronics Engineers (IEEE) 802.15.4 communications between wireless security sensors of a security system and a security system control panel or an access point and IEEE 802.11 communications on a wireless local area network (WLAN) by the security system control panel or the access point. In some embodiments, the security system control panel or the access point can efficiently allocate unused 802.15.4 slots of the TDMA superframe for the 802.11 communications. Accordingly, each of the slots of the TDMA superframe can be used for wireless communications.

In some embodiments, the security system control panel or the access point can allocate one of the slots of the TDMA superframe to one of the wireless security sensors only after the one of the wireless security sensors is added to a wireless network defined by a 802.15.4 protocol. As such, a number of the slots of the TDMA superframe allocated to the 802.15.4 communications can be equal to a number of the wireless security sensors connected to the wireless network defined by the 802.15.4 protocol, and remaining ones of the slots of the TDMA superframe can be allocated to the 802.11 communications.

In some embodiments, the security system control panel or the access point can determine whether a first wireless security sensor is sending data via the 802.15.4 protocol during the first wireless security sensor's assigned one of the TDMA superframe slots. Then, the security system control panel or the access point can allocate the assigned one of the TDMA superframe slots to the first wireless security sensor when the first wireless security sensor has data to send during the assigned one of the TDMA superframe slots, or the security system control panel or the access point can allocate the assigned one of the TDMA superframe slots for the 802.11 communications by the security system control panel or the access point when the first wireless security sensor does not have any data to send during the assigned one of the TDMA superframe slots. The access point can also assign unused TDMA superframe slots to 802.11 communications when the access point has no data to send to the first wireless security sensor.

For example, the security system control panel or the access point can determine whether the first wireless security sensor has data to send by timestamping each packet received from the first wireless security sensor via the 802.15.4 protocol during the assigned one of the TDMA superframe slots. Furthermore, the security system control panel or the access point can update a timestamp of each packet received from the first wireless security sensor via the 802.15.4 protocol upon receiving a synchronization header (SHR), which can be included in every packet received via the 802.15.4 protocol. Then, the security system control panel or the access point can determine if the timestamp matches a time corresponding with a beginning of the assigned one of the TDMA superframe slots. If the timestamp is different than the time corresponding with the beginning of the assigned one of the TDMA superframe slots, then the security system control panel or the access point can reserve the assigned one of the TDMA superframe slots for the 802.15.4 communications received from the first wireless security sensor. However, if the timestamp matches the time corresponding with the beginning of the assigned one of the TDMA superframe slots, then the security system control panel or the access point can allocate the assigned one of the TDMA superframe slots for the 802.11 communications by the security system control panel or the access point.

FIG. 1 is a block diagram of a security system 10 shown generally in accordance with an exemplary embodiment. The security system 10 can include one or more wireless security sensors 12, 14 that monitor a secured area 16 for threats, and in some embodiments, the wireless security sensors 12, 14 can include intrusion, camera, motion, fire, smoke, and gas detectors. The wireless security sensors 12, 14 can communicate with a control panel 18 via an IEEE 802.15.4 protocol, and the control panel 18 can monitor for activation of the wireless security sensors 12, 14. In some embodiments, the wireless security sensors 12, 14 can additionally or alternatively connect to an access point, and the access point can route messages from the security sensors 12, 14 to the control panel 18 or a device located outside of the secured area 16.

In some embodiments, the control panel 18 may send an alarm message to a central monitoring station 20 upon activation of one of the wireless security sensors 12, 14, and in some embodiments, alarm message may be sent through a router 22 and the Internet 24 to the central monitoring station 20. The central monitoring station 20 may respond by summoning the appropriate help. For example, if the one of the wireless security sensors 12, 14 detects a fire, then the central monitoring station 20 may summon a local fire department. Alternatively, if the one of the wireless security sensors 12, 14 detects an intrusion, then the central monitoring station 20 may summon the police.

The router 22 can also host a wireless local area network (WLAN) 26, and one or more user devices 28, 30 (e.g., iPhones, Smart TVs, gaming consoles, Android devices, etc.) can connect to the WLAN 26 and communicate with the router 22 using an IEEE 802.11 protocol. The user devices 28, 30 may exchange data through the Internet 24 or the WLAN 26 under an appropriate format (e.g., TCP/IP, etc.), and the control panel 18 may communicate the alarm message or other status updates (e.g. live video captured by a camera 12, 14) to a remote device 31 via the router 22 and via the 802.11 protocol.

It is to be understood that, while the systems and methods disclosed herein are described in connection with the IEEE 802.11 protocol and the IEEE 802.15.4 protocol, the systems and methods disclosed herein are not limited to the 802.11 and 802.15.4 protocols. Indeed, the systems and methods disclosed herein can be used in connection with any wireless protocols, standards, or technologies. For example, in some embodiments, the systems and methods disclosed herein can be used in connection with wireless protocols operating in the same wireless band or overlapping wireless bands, including LTE, Bluetooth, or any other IEEE protocols.

The control panel 18 can include control circuitry 32, which can include one or more programmable processors 32a and executable control software 32b as would be understood by one of ordinary skill in the art. The executable control software 32b can be stored on a transitory or non-transitory computer readable medium, including, but not limited to local computer memory, RAM, optical storage media, magnetic storage media, and the like. In some embodiments, the control circuitry 32, the programmable processor 32a, and the control software 32b can execute and control some of the methods disclosed herein.

Furthermore, in some embodiments, the control panel 18 may include a radio frequency transceiver module 34 for sending and receiving 802.15.4 communications via the 802.15.4 protocol and a Wi-Fi transceiver module 36 for sending and receiving 802.11 communications via the 802.11 protocol. The control circuitry 32, the programmable processor 32a, and the control software 32b can enable one of the radio frequency transceiver module 34 and the Wi-Fi transceiver module 36 that is transmitting or receiving a message, and the control circuitry 32, the programmable processor 32a, and the control software 32b can disable the other of the radio frequency transceiver module 34 and the Wi-Fi transceiver module 36 that is not transmitting or receiving the message. For example, when the Wi-Fi transceiver module 36 is transmitting the message, the control circuitry 32, the programmable processor 32a, and the control software 32b can disable the radio frequency transceiver module 34, and when the radio frequency transceiver module 34 is transmitting the message, the control circuitry 32, the programmable processor 32a, and the control software 32b can disable the Wi-Fi transceiver module 36. In this way, 802.11 communications do not interfere with 802.15.4 communications and vice versa.

To further limit wireless interference between the 802.11 communications and the 802.15.4 communications, the control circuitry 32, the programmable processor 32a, and the control software 32b can divide wireless transmissions within a TDMA superframe, where some slots of the TDMA superframe are allocated to the 802.15.4 communications and some slots of the TDMA superframe are allocated for the 802.11 communications. In some embodiments, each of the slots of the TDMA superframe allocated to the 802.15.4 communications is dedicated to a single one of the wireless security sensors 12, 14.

Figure 2:
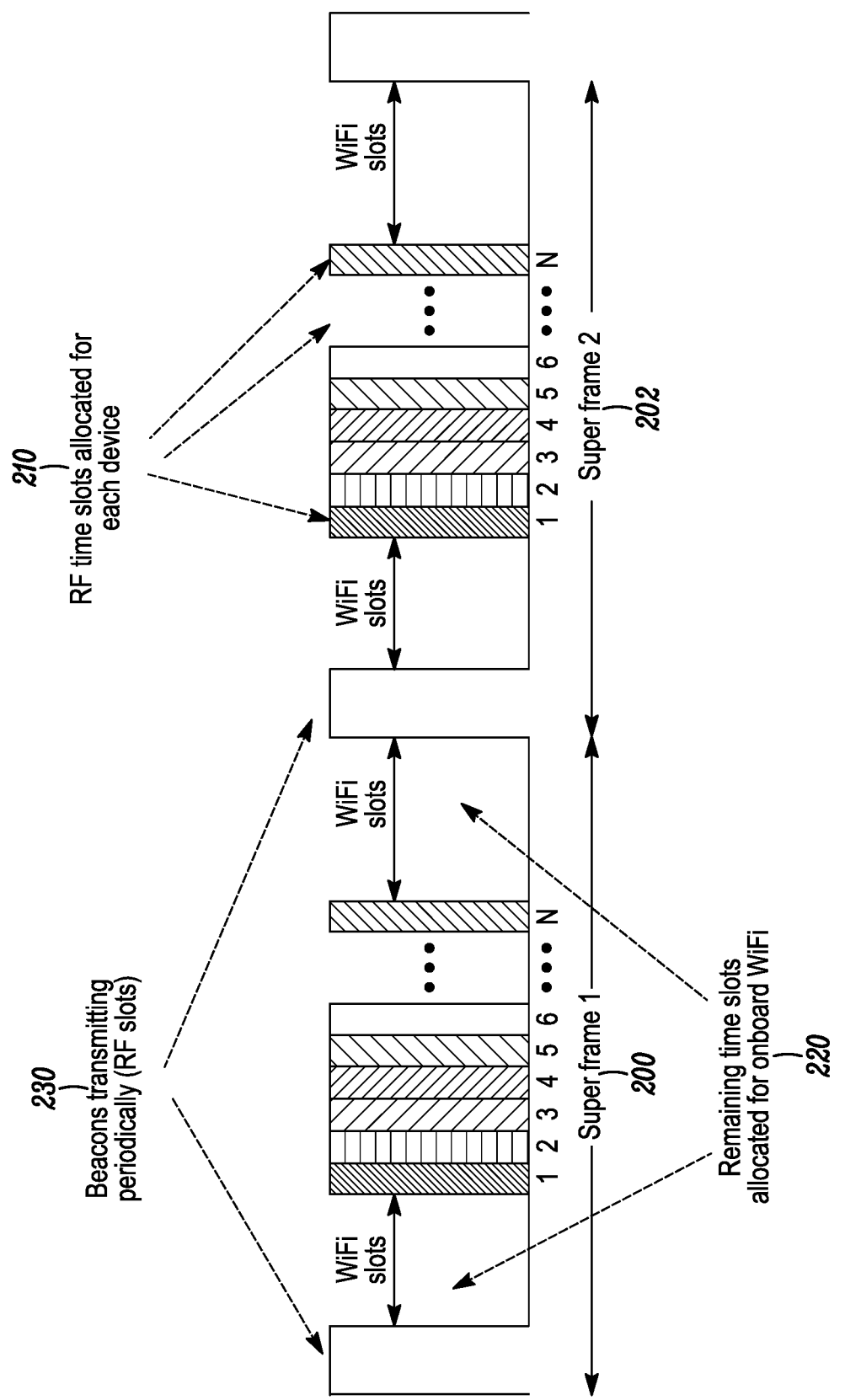
FIG. 2 is a diagram of time division multiple access (TDMA) superframes in accordance with disclosed embodiments.

FIG. 2 illustrates a first superframe 200 and a second superframe 202 in accordance with disclosed embodiments. As seen, each of the first and second superframes 200, 202 can include 802.15.4 (i.e. RF) slots 210 allocated to the 802.15.4 communications with 802.15.4 devices, such as the wireless security sensors 12, 14, and 802.11 slots 220 allocated to the 802.11 communications (e.g. Wi-Fi communication). As explained herein, each of the 802.15.4 slots 220 can be allocated to a respective one of the wireless security sensors 12, 14. Furthermore, in some embodiments, each of the first and second superframes 200, 202 may include a beacon 230 that begins each of the respective superframes 200, 202.

As the number of wireless security sensors 12, 14 within the secured area 16 increases, the number and percentage of the 802.15.4 slots 210 in the superframes 200, 202 can also increase, and thus, the percentage of the 802.11 slots 220 in the superframes 200, 202 can decrease. Due to the nature of security systems, the 802.15.4 communications from the wireless security sensors 12, 14 have a higher priority than the 802.11 communications to ensure that the threats detected by the wireless security sensors 12, 14 are promptly reported to the control panel 18. However, one or more of the wireless security sensors 12, 14 may not transmit data during its assigned slot of the superframes 200, 202, or one or more of the wireless security sensors 12, 14 may transmit data infrequently because it has no data to report. In these circumstances, some assigned slots of the superframes 200, 202 are empty and can be reallocated.

Figure 3:
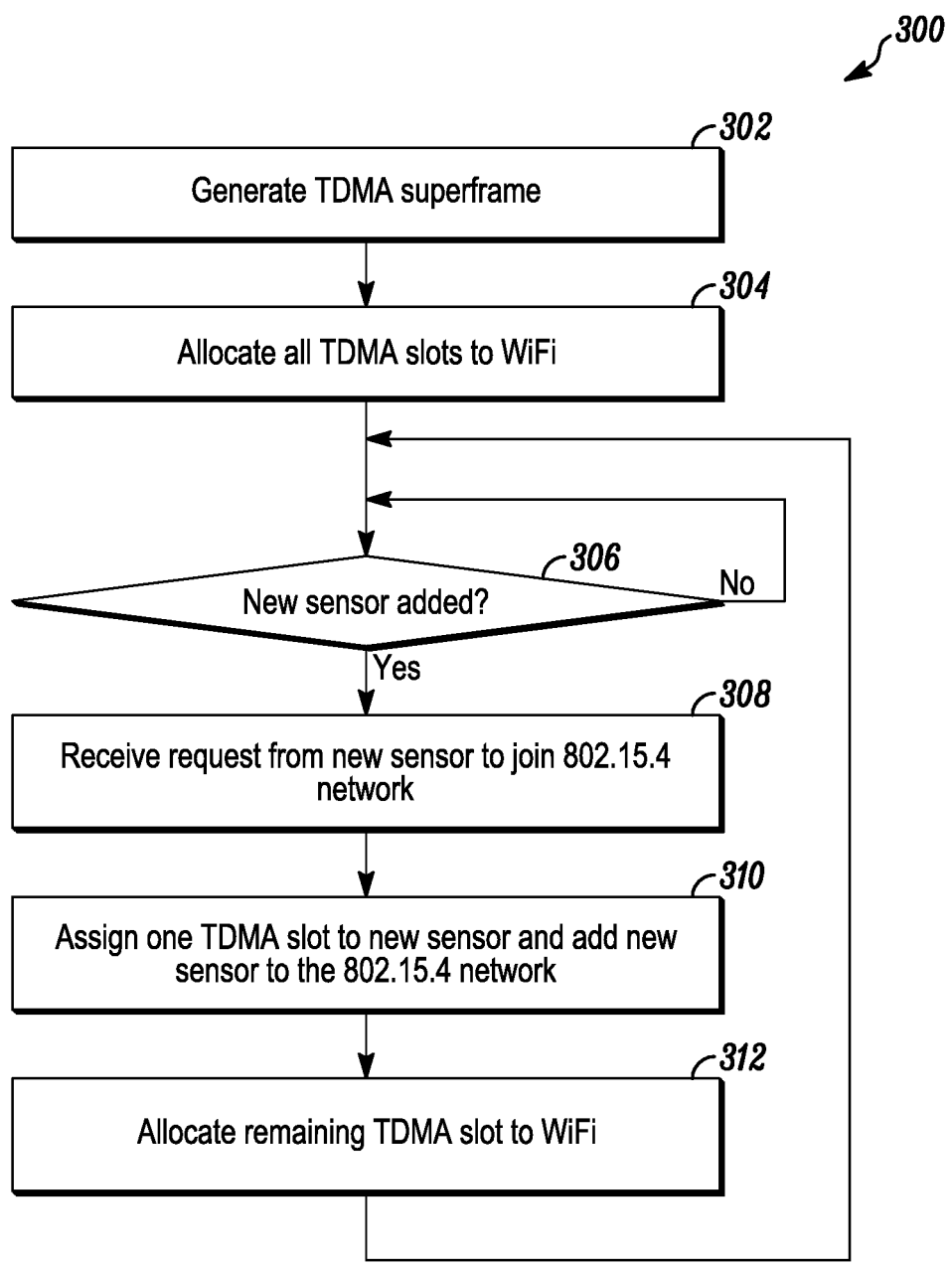
FIG. 3 is a flow diagram of a method in accordance with disclosed embodiments.

FIG. 3 is a flow diagram of a method 300 in accordance with disclosed embodiments for allocating slots of the superframes 200, 202 in accordance with disclosed embodiments. As seen in FIG. 3, the method 300 can include a processor (e.g. the programmable processor 32a) generating a TDMA superframe (e.g. superframes 200, 202) as in 302, and the processor allocating all slots of the TDMA superframe to the 802.11 communications as in 304. The method 300 can also include the processor determining whether a new sensor (e.g. wireless security sensors 12, 14) is requesting to be added to a security system network (e.g. 802.15.4 network) as in 306. If no sensor is requesting to be added to the security system network, then the method 300 continue determining whether a new sensor is requesting to be added as in 306. However, when the processor determines that a new sensor is requesting to be added to the security system network as in 306, the method 300 can include the processor receiving a request from the new sensor to join the security system network as in 308, assigning one of the slots of the TDMA superframe to the new sensor, thereby adding the new sensor to the security system network, allocating the one of the slots to the 802.15.4 communications with the new sensor as in 310, and allocating any remaining slots of the TDMA superframe to the 802.11 communications as in 312. Then, the method 300 can continue determining whether a new sensor is requested to be added as in 306 until a predetermined number of sensors (e.g. 128) have joined the security system network.

Figure 4:
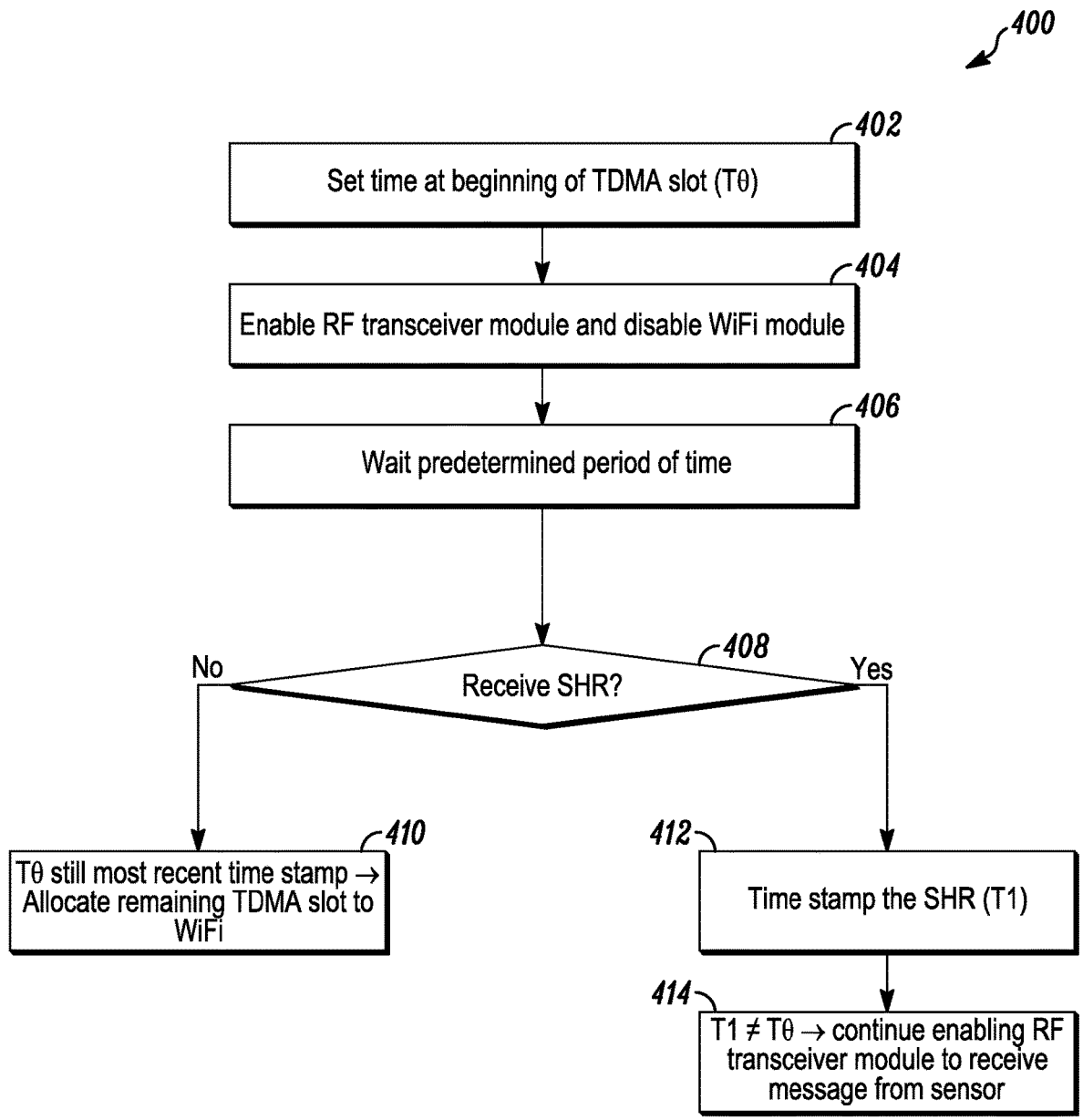
FIG. 4 is a flow diagram of a method in accordance with disclosed embodiments.

While the method 300 of FIG. 3 can refrain from allocating slots of the TDMA superframe to sensors that have yet to join the security system network, the method 300 of FIG. 3 does not prevent a slot of the TDMA superframe from being empty, for example, when a sensor assigned to such a slot of the TDMA superframe does not have any data to transmit or receive. Accordingly, FIG. 4 is a flow diagram of a method 400 in accordance with disclosed embodiments for reallocating slots of the superframes 200, 202 in accordance with disclosed embodiments. The method 400 may be executed in addition to or as an alternative to the method 300.

Figure 5:
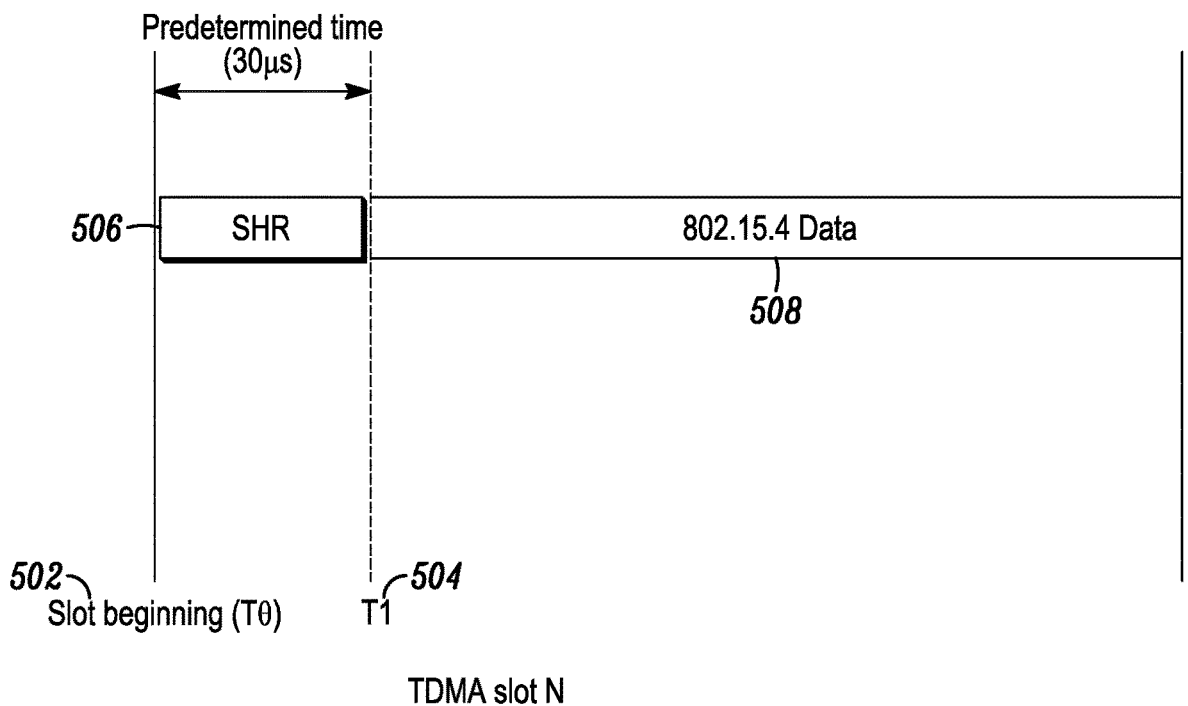
FIG. 5 is a diagram of a first slot of a superframe in accordance with disclosed embodiments.
Figure 6:
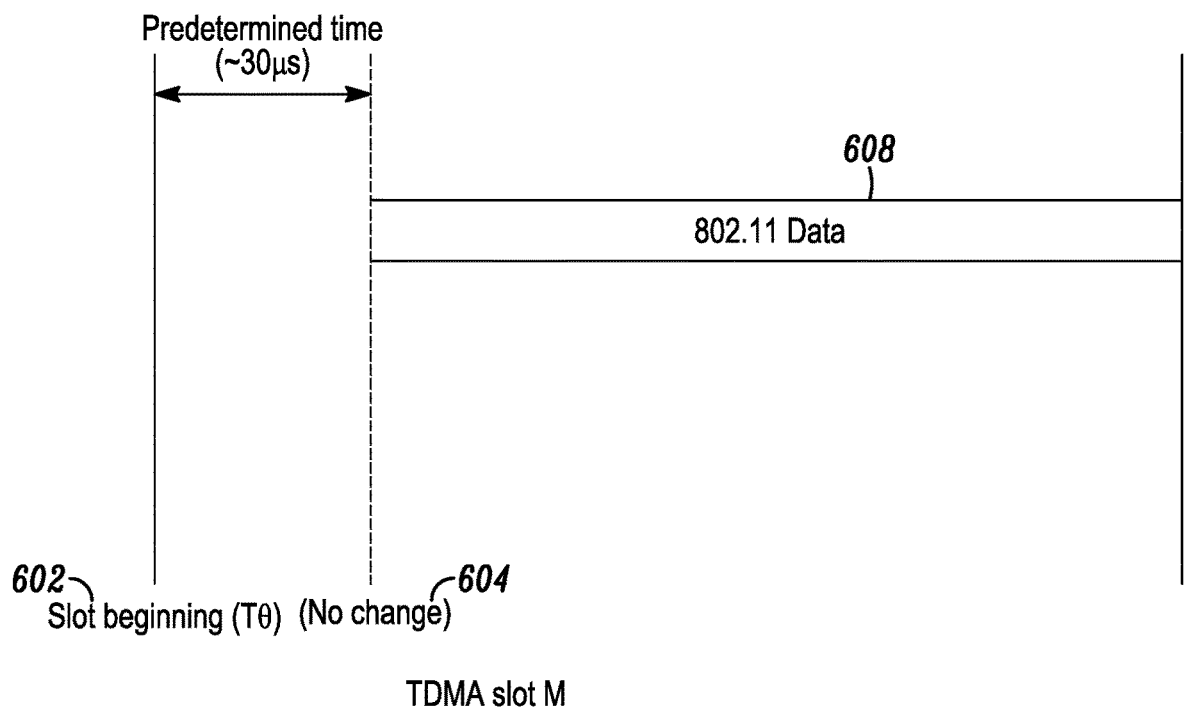
FIG. 6 is a diagram of a second slot of a superframe in accordance with disclosed embodiments.

As seen in FIG. 4, FIG. 5, and FIG. 6, the method 400 can include a processor (e.g. the programmable processor 32a) setting a timestamp (T0) at the beginning 502, 602 of an RF (i.e. 802.15.4) slot M, N of the TDMA superframe as in 402. The method 400 can also include the processor enabling an RF transceiver module (e.g. the radio frequency transceiver module 34) and disabling a Wi-Fi transceiver module (e.g. the Wi-Fi transceiver module 36) as in 404, and the processor waiting a predetermined period of time 504, 604 for a transmission from a sensor associated with the RF slot M, N of the TDMA superframe as in 406. For example, the predetermined period of time 504, 604 may be approximately 300 μs or enough time to receive 5 bytes of data from the sensor.

After waiting the predetermined period of time 504, 604, the method 400 can include the processor determining whether it received a synchronization header (SHR) 506 from the sensor as in 408. When the processor determines that it did not receive the SHR 506 as in 408, the method 400 can include the processor determining that the sensor associated with the RF slot M of the TDMA superframe does not have any data to transmit or receive and allocating any remaining time in the RF slot M of the TDMA superframe to the Wi-Fi transceiver module to communicate via the 802.11 protocol as in 410. For example, the processor can determine that it did not receive the SHR 506 by refraining from updating the timestamp (T0) and by determining that the current setting of the timestamp equals time T0 or that the current setting of the timestamp matches a time corresponding with the beginning of the RF slot M of the TDMA superframe.

However, when the processor determines that it did receive the SHR 506 as in 408, the method 400 can include the processor updating the timestamp to time T1 as in 412, determining that the sensor associated with the RF slot N of the RF TDMA superframe has data to transmit or receive, and allocating any remaining time in the RF slot N of the TDMA superframe to the RF transceiver module to communicate via the 802.15.4 protocol as in 414. For example, the processor can determine that it received the SHR 506 by determining that the current setting of the timestamp (T1) is not equal to time T0 or that the current setting of the timestamp does not match a time corresponding with the beginning of the RF slot N of the TDMA superframe.

In summary, the systems and methods disclosed herein can prevent any 802.15.4 slots in the TDMA superframe from being empty and reallocating any such slots to 801.11 slots. As such, Wi-Fi usage can be improved, which can lead to improvements in video transmissions by the control panel or any other onboard Wi-Fi capabilities of the control panel.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:
1. A method comprising:
  enabling, by an access point, a first transceiver module at a beginning of a slot of a time division multiple access (TDMA) superframe, wherein the first transceiver module wirelessly communicates via a first protocol;
  setting, by the access point, a timestamp at the beginning of the slot of the TDMA superframe having a value equal to a time corresponding with the beginning of the slot of the TDMA superframe;
  updating, by the access point, the timestamp upon receiving a synchronization header of first data from a wireless device via the first protocol;
  determining, by the access point, that the first transceiver module received the first data from the wireless device via the first protocol within a predetermined period of time from the beginning of the slot of the TDMA superframe when the timestamp fails to match the time corresponding with the beginning of the slot of the TDMA superframe;
  when the first transceiver module receives the first data from the wireless device via the first protocol within the predetermined period of time from the beginning of the slot of the TDMA superframe, receiving, at the access point, second data from the wireless device via the first protocol for a remainder of the slot of the TDMA superframe; and
  when the first transceiver module fails to receive the first data from the wireless device via the first protocol within the predetermined period of time from the beginning of the slot of the TDMA superframe, enabling, by the access point, a second transceiver module for the remainder of the slot of the TDMA superframe,
  wherein the second transceiver module wirelessly communicates via a second protocol, and wherein the remainder of the slot of the TDMA superframe extends from an end of the predetermined period of time from the beginning of the slot of the TDMA superframe until an end of the slot of the TDMA superframe.

2. The method of claim 1 wherein the first protocol includes an Institute of Electrical and Electronics Engineers (IEEE) 802.15.4 protocol.

3. The method of claim 2 wherein the second protocol includes an IEEE 802.11 protocol.

4. The method of claim 2 wherein the synchronization header of the first data is defined by the IEEE 802.15.4 protocol.

5. A method comprising:
enabling, by an access point, a first transceiver module at a beginning of a slot of a time division multiple access (TDMA) superframe, wherein the first transceiver module wirelessly communicates via a first protocol;
setting, by the access point, a timestamp at the beginning of the slot of the TDMA superframe having a value equal to a time corresponding with the beginning of the slot of the TDMA superframe
determining, by the access point, that the first transceiver module failed to receive first data from a wireless device via the first protocol within a predetermined period of time from the beginning of the slot of the TDMA superframe when the timestamp matches the time corresponding with the beginning of the slot of the TDMA superframe;
when the first transceiver module receives the first data from the wireless device via the first protocol within the predetermined period of time from the beginning of the slot of the TDMA superframe, receiving, at the access point, second data from the wireless device via the first protocol for a remainder of the slot of the TDMA superframe; and
when the first transceiver module fails to receive the first data from the wireless device via the first protocol within the predetermined period of time from the beginning of the slot of the TDMA superframe, enabling, by the access point, a second transceiver module for the remainder of the slot of the TDMA superframe,
wherein the second transceiver module wirelessly communicates via a second protocol, and
wherein the remainder of the slot of the TDMA superframe extends from an end of the predetermined period of time from the beginning of the slot of the TDMA superframe until an end of the slot of the TDMA superframe.

6. The method of claim 1 further comprising:
disabling, by the access point, the second transceiver module when the first transceiver module is enabled.

7. The method of claim 1 wherein the predetermined period of time is 300 µs.

8. An access point comprising:
a first transceiver module that wirelessly communicates via a first protocol;
a second transceiver module that wirelessly communicates via a second protocol;
a programmable processor; and
executable control software stored on a non-transitory computer readable medium,
wherein the programmable processor and the executable control software enable the first transceiver module at a beginning of a slot of a time division multiple access (TDMA) superframe,
wherein the programmable processor and the executable control software set a timestamp at the beginning of the slot of the TDMA superframe having a value equal to a time corresponding with the beginning of the slot of the TDMA superframe,
wherein the programmable processor and the executable control software update the timestamp upon receiving a synchronization header of first data from a wireless device via the first protocol,
wherein the programmable processor and the executable control software determine that the first transceiver module received the first data from the wireless device via the first protocol within a predetermined period of time from the beginning of the slot of the TDMA superframe when the timestamp fails to match the time corresponding with the beginning of the slot of the TDMA superframe,
wherein, when the first transceiver module receives the first data from the wireless device via the first protocol within the predetermined period of time from the beginning of the slot of the TDMA superframe, the programmable processor and the executable control software enable the first transceiver module to receive second data from the wireless device via the first protocol for a remainder of the slot of the TDMA superframe,
wherein, when the first transceiver module fails to receive the first data from the wireless device via the first protocol within the predetermined period of time from the beginning of the slot of the TDMA superframe, the programmable processor and the executable control software enable the second transceiver module for the remainder of the slot of the TDMA superframe, and
wherein the remainder of the slot of the TDMA superframe extends from an end of the predetermined period of time from the beginning of the slot of the TDMA superframe until an end of the slot of the TDMA superframe.

9. The access point of claim 8 wherein the first protocol includes an Institute of Electrical and Electronics Engineers (IEEE) 802.15.4 protocol.

10. The access point of claim 9 wherein the second protocol includes an IEEE 802.11 protocol.

11. The access point of claim 9 wherein the synchronization header of the first data is defined by the IEEE 802.15.4 protocol.

12. The access point of claim 8
wherein the programmable processor and the executable control software determine that the first transceiver failed to receive the first data from the wireless device via the first protocol within the predetermined period of time from the beginning of the slot of the TDMA superframe when the timestamp matches the time corresponding with the beginning of the slot of the TDMA superframe.

13. The access point of claim 8 wherein the programmable processor and the executable control software disable the second transceiver module when the first transceiver module is enabled.

14. The access point of claim 8 wherein the predetermined period of time is 300 µs.

* * * * *